United States Patent [19]

Takubo et al.

[11] Patent Number: 4,863,653

[45] Date of Patent: Sep. 5, 1989

[54] PROCESS OF PRODUCING THERMOPLASTIC RESIN SHEET AND EQUIPMENT THEREFOR

[75] Inventors: Toyokazu Takubo; Atsushi Fujii, both of Himeji, Japan

[73] Assignee: Idemitsu Petrochemical Co., Ltd., Tokyo, Japan

[21] Appl. No.: 159,384

[22] Filed: Feb. 23, 1988

[51] Int. Cl.$^4$ ............................................. B29C 47/10
[52] U.S. Cl. ............................... 264/40.7; 264/176.1; 264/180; 264/211.23; 264/237; 264/349; 425/71; 425/145; 425/149; 425/205
[58] Field of Search ............... 264/178 R, 180, 40.1, 264/40.7, 40.3, 211.21–211.24, 349, 176.1; 425/149, 145, 204–208, 71

[56] References Cited

U.S. PATENT DOCUMENTS

| | | | |
|---|---|---|---|
| 3,148,231 | 9/1964 | Spencer | 264/40.7 |
| 3,261,056 | 7/1966 | Fritsch . | |
| 3,467,743 | 9/1969 | Otani | 425/205 |
| 3,764,118 | 10/1973 | Matsuoka | 259/192 |
| 3,860,220 | 1/1975 | Matsubayashi et al. | 264/211.23 |
| 4,117,063 | 9/1978 | Voigt et al. | 264/349 |
| 4,134,714 | 1/1979 | Driskill | 425/208 |
| 4,452,750 | 6/1984 | Handwerk et al. | 264/40.3 |
| 4,548,778 | 10/1985 | Fujii | 264/178 R |
| 4,666,649 | 5/1987 | Takubo et al. | 264/176.1 |
| 4,729,666 | 3/1988 | Takubo | 425/208 |

FOREIGN PATENT DOCUMENTS

| | | |
|---|---|---|
| 0079012 | 5/1983 | European Pat. Off. . |
| 3316838 | 11/1984 | Fed. Rep. of Germany . |
| 2585282 | 1/1987 | France . |
| 58-203018 | 11/1983 | Japan .............. 264/180 |
| 59-05044 | 1/1984 | Japan . |
| 2053013A | 2/1981 | United Kingdom . |

Primary Examiner—Jeffery Thurlow
Attorney, Agent, or Firm—Flynn, Thiel, Boutell & Tanis

[57] ABSTRACT

This invention relates to a process of producing a thermoplastic resin sheet and equipment therefore. The equipment includes a first extruder of a high kneading type, a second extruder of a low kneading type and an extrusion die. A film-shaped resin extruded from the extrusion die is cooled by a cooling device, to thereby obtain the resin sheet. Additionally, a difference between pressures at the outlets of the first and second extruders is detected, and, in response to this difference between the pressures thus detected, the operating conditions of the first extruder are automatically controlled.

12 Claims, 3 Drawing Sheets

PROCESS OF PRODUCING THERMOPLASTIC RESIN SHEET AND EQUIPMENT THEREFOR

BACKGROUND OF THE INVENTION

1. Field of the Invention

This invention relates to a process of producing a resin sheet or film from thermoplastic resin and to equipment therefore.

2. Description of the Prior Art

Crystalline thermoplastic resins such as polypropylene and polyethylene have been utilized in various packaging fields and the like as sheets and containers due to their easiness in being thermoformed.

In producing crystalline thermoplastic resin sheets as represented by polypropylene as described above, to improve the transparency of these sheets, it has been practice that the molten resin sheet (melt web) be quenched to control the crystalline structure. In a quenching process of this type, water cooling is the most efficient process. However, this process presents a problem in that it is difficult to cool uniformly a molten film-shaped resin (melt web) extruded from an extrusion die. The inventors of the present invention have proposed a process of using a multi-stage slit, through which cooling water flows down, as a process of uniformly water-cooling the molten film-shaped resin (Japanese Patent Kokai (Laid-Open) No. 58-203018).

However, even if the cooling conditions are controlled, the cooling effect thereof is naturally limited, whereby the transparency, surface uniformity of the resin sheet, in the molded items, have not always been satisfactory.

As the result of various studies conducted by the inventors of the present invention, it was found that conditions of extrusion have a great influence at a stage of molten film-shaped resin, where the molten film-shaped resin extruded has not yet come into contact with the cooling water, i.e. at a stage covering a range from feeding a material to a resin extruder to an extrusion die. Based on this, a process of using an extruder provided at the forward end portion thereof with a stress relaxing section as one of the above-described conditions of extrusion is devised, and a process, in which the above-described conditions of extrusion are combined with a slit water cooling method in use, has also been proposed (Patent Kokai (Laid-Open) No. 62-146611 and patent application No. 61-202146). These processes are outstanding ones, but, present such disadvantages that the selection of the devices is limited, and it is difficult to combinedly satisfy the kneading properties (extensive mixing, dispersing), stress relaxing properties and extrusion stability.

To solve the problems between the kneading properties and stress relaxing properties, and between the high speed molding properties and low temperature extrusion properties, there has been known a tandem extruder (cascade extruder) constituted by two extruders (Patent Kokai (Laid-Open) No. 59-5044).

This tandem extruder is constructed such that a first and a second extruders are serially connected to each other through a connecting pipe, and pressure detectors are provided on an outlet side of the second extruder and the connecting pipe, respectively, whereby the screw speed of the first extruder is controlled so that a difference between pressures detected by these pressure detectors can be held at a predetermined relationship.

With the above-described tandem extruder, in general, there are offered the advantages that the extruders can be designed such that the first extruder performs plasticization and kneading of the resin and the second extruder carries out mixing (distribution) resin temperature uniformity and metered extrusion, to thereby meet the respective functions of the extruders.

However, the first extruder mainly aims at plasticization and kneading, but, in actuality, the dispersing properties, kneading properties, resin temperature uniformity properties and the like cannot be expected so much therefrom. For this reason, the resin is extruded from the outlet of the first extruder in a state where the kneading (dispersion) and resin temperature uniformity are unsatisfactory, and, in order to produce a satisfactory sheet, it is necessary to further carry out the dispersion, kneading (dispersion), mixing (distribution) and resin temperature uniformity in the second extruder.

Accordingly, in the second extruder, shear stress and resin temperature become high, with the result that the resin, being low in temperature and low in residual stress, cannot be extruded, so that a sheet having excellent transparency and glossiness, etc. cannot be obtained.

SUMMARY OF THE INVENTION

The present invention has as its object the provision of a process, and equipment therefor, whereby satisfactory kneading, (dispersion), mixing (distribution) and resin temperature uniformity of thermoplastic resin is secured, stress is relaxed and low temperature extrusion is carried out at high speed, so that molded items of high quality and excellent in characteristics such as transparency can be produced stably and with high productivity.

The process according to the present invention has been based on the facts that the transparency of the resin sheet is varied depending on the water-cooled state of the molten film-shaped resin and the limit of the water cooling effect is closely associated with conditions of extrusion at a stage of resin extrusion. Water cooling of the molten film-shaped resin is carried out such that the molten film-shaped resin is introduced and made to run through a slit, at the inlet of which, the cooling water does not substantially stagnate, as the conditions of extrusion, kneading and stress relaxing are satisfactorily carried out. In order to achieve the satisfactory kneading and stress relaxing by use of one extruder, a special screw construction is needed, whereby the scope of selection of the device is limited. For this reason, according to the present invention, an extruder aiming at satisfactory plasticization and kneading is separated from another extruder aiming at satisfactory stress relaxing, whereby, without limiting the scope of selection of the equipment, a thermoplastic resin sheet having the satisfactory optical characteristics is obtainable.

In consequence, in the process according to the present invention, to carry out satisfactory plasticization and kneading, a first extruder of a high kneading type having a compression ratio of 2 or more, preferably 3 or more, for example, is used, while, to perform the satisfactory stress relaxing, a second extruder of a low kneading type having a steady extrusion function of a compression ratio of less than 2, preferably 1.5 or less, and normally, a compression ratio of about 1, for example, is used. With the above-described arrangement, in the first extruder, thermoplastic resin is kneaded into a molten state, which is extruded through a connecting pipe into the second extruder, where, while the satisfactory stress relaxing is carried out, resin is extruded from a die as a molten film-shaped resin having the excellent surface characteristics, and this molten film-shaped resin is introduced into a slit, through which the cooling water flows down without stagnating at the inlet of the slit, and cooled as described above, to thereby improve the optical characteristics such as the transparency.

The equipment according to the present invention includes: a first extruder; a second extruder serially connected to this first extruder; a die provided on the side of extrudate of the second extruder, for extruding molten film-shaped resin; and a cooling device, to cool the molten film-shaped resin extruded from the die, provided with a slit through which cooling water flows down, whereby the film-shaped resin can be introduced and made to run in the slit. In this case, a gear pump is preferably provided between the first and the second extruders.

In the first extruder, thermoplastic resin is plasticized and kneaded, (dispersion), temperature uniformity of the thermoplastic resin are fairly carried out, and the plasticized resin is supplied to the second extruder through a connecting pipe. In this case, when a gear pump is provided between the first and the second extruders, even if the plasticized resin is unsatisfactorily kneaded, the plasticized resin is satisfactorily and uniformly kneaded by the rotation of the gear pump and pumped out at a constant flow rate. Furthermore, due to the operation of this gear pump, fluctuations in pressure at the outlet of the first extruder is minimized and control of the screw speed of the first extruder becomes easy.

Subsequently, the molten resin is supplied to the second extruder, where satisfactory stress relaxation, uniformity of the resin temperature, and further, cooling of the resin temperature are performed as necessary, the molten resin is extruded from the die, and the molten film-shaped resin thus extruded is cooled through the cooling device.

DETAILED DESCRIPTION OF THE PREFERRED EMBODIMENT

One embodiment of the present invention will hereunder be described with reference to the accompanying drawings.

The thermosplastic resins used in the present invention can be polypropylene group resins such as a homopolymer of propylene, a random copolymer of propylene with another $\alpha$-olefin of 20 weight % or less, and a blend of these. A blend obtainable by multi-stage polymerization is included in this blend. Other thermoplastic resins utilized in the present invention include polyethylene group resins, a mixture of polypropylene group resins with polyethylene group resins of elastomers, polyesters, polyamides and the like. Further, resins analogous to the above-described resins can be applied to a co-extrusion multi-layer sheet, these resins including adhesive resins such as a graft copolymer of maleic anhydride and polyolefin resin, easily weldable resins such as a copolymer of ethylene-vinyl acetate, and gas barrier resins such as a copolymer of ethylene-vinyl alcohol, polyamide and polyethylene terephthalate.

Figure 1:
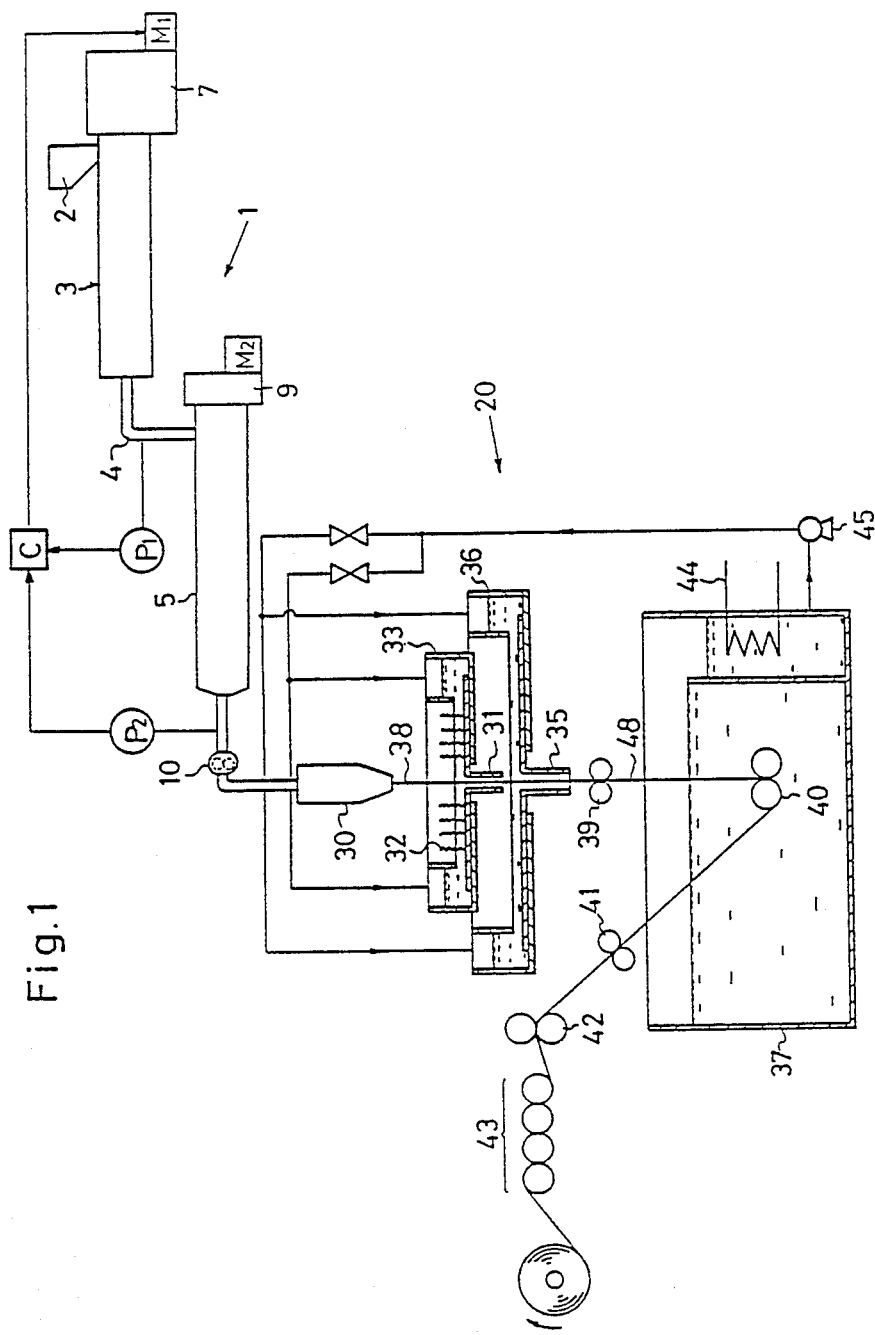
FIG. 1 is a general arrangement diagram showing a system constituted by an extrusion unit and a cooling device, which are applied to one embodiment of a process of producing a thermoplastic resin sheet and the like according to the present invention.

FIG. 1 shows the general arrangement of the system provided with an extrusion unit 1 and a cooling device 20. Referring to the drawing, the extrusion unit 1 includes a first extruder 3 being of a high kneading type, having a single or double screw shafts and provided with a hopper 2 for feeding the resin, and a second extruder 5 being of a low kneading type, having a single screw shaft and serially connected to the outlet side of the first extruder 3 through a connecting pipe 4.

The first extruder 3 plasticizes resin pellets fed from a hopper 2 and rotationally drives a screw through a motor $M_1$ for driving the screw and a speed reducer 7 (provided that the motor is directly connected, the speed reducer may be dispensed with), so that the molten resin can be plasticized and kneaded (dispersed).

In the second extruder 5, the stress of the molten resin kneaded by the first extruder 3 is relaxed, so that a resin sheet being excellent in characteristics of quality such as transparency can be extruded at high speed. This second extruder 5 is provided with a motor $M_2$ and a speed reducer 9 similar to the first extruder 3. An extrusion die 30 is connected to the outlet side of the second extruder 5 through a gear pumping 10 for pumped out a constant flow rate. In the second extruder 5, the screw and/or a cylinder is regulated in temperature by the use of a heat transfer medium for example, so that the resin temperature can be lowered.

Pressure detectors $P_1$ and $P_2$ are provided in the intermediate portion of the connecting pipe 4 to connect the first extruder 3 to the second extruder 5, and between the second extruder 5 and the gear pump 10, respectively. Pressure values detected by these pressure detectors $P_1$ and $P_2$ are delivered to a controller C, which, in response to the detected results, controls the speed of the motor $M_1$ for driving the screw of the first extruder 3. In this case, control of the motor $M_1$ by the controller C is performed such that a difference of (a value detected by the pressure detector $P_2$)—(a value detected by the pressure detector $P_1$) should be maintained at a constant value.

The cooling device 20 includes: a top stage water tank 33 having a slit 31, through which the cooling water for quenching a molten film-shaped resin 38 flows down, and porous flow regulating members 32 for preventing stagnation of the cooling water at an inlet of the slit 31 to smooth the flow; a bottom stage water tank 36 positioned at a stage downwardly of the top stage water tank 33 and having a slit 35 positioned immediately beneath the slit 31; a water tank 37 positioned further downwardly of the bottom stage water tank 36; clamping rolls 39 and 40 for clamping a cooled film-shaped resin 48 under pressure to maintain the running speed of the film-shaped resin 48 at a constant value; rolls 41 and 42 for taking up the film-shaped resin 48 passing through the water tank 37; a group of rolls 43 for heat-treating (annealing) the film-shaped resin 48 in a predetermined manner; and a pump 45 for circulating the cooling water, which has flowed down through the water tank 37 to be cooled by a cooler 44, through the top stage water tank 33 and the bottom stage water tank 36.

In the cooling device 20, the molten film-shaped resin 38 extruded from the extrusion die 30 is introduced into the slits 31 and 35 of the top stage water tank 33 and the bottom stage water tank 36, through which the cooling water flows down, passed through the cooling water in the water tank 37 through the clamping rolls 39 and 40, taken up by the take-up rolls 41 and 42, and thereafter, heat-treated in a predetermined manner by the group of rolls 43 as necessary, to thereby complete the molding of the resin sheet. In this case, the flow-down speed of the cooling water from the slits 31 and 35 is made larger than the running speed of the molten film-shaped resin 38, whereby the quantity of the cooling water being in contact with the molten film-shaped resin 38 is increased, so that the cooling effect can be improved. The cooling water is preferably prevented from stagnating at the inlet of the slit 31 when the cooling water flows into the top stage slit 31. For this purpose, the water level in the top stage water tank 33 needs to be held low. If stagnation takes place, then, non-uniform cooling of the molten film-shaped resin occurs, so that a sheet being low in haze on the outer surface thereof cannot be obtained.

FIG. 1 shows a preferable case of the cooling in the two-stage slits, however, the top stage slit 31 suffices depending on the thickness of the sheet or the like, the molding speed, etc.

Figure 2:
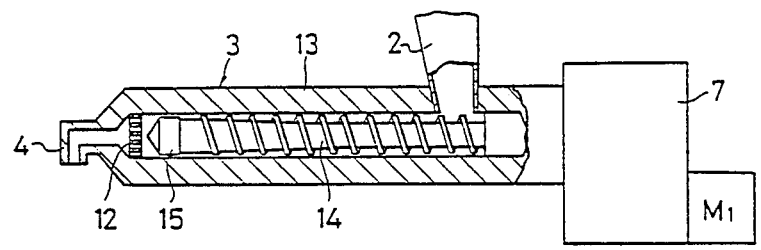
FIG. 2 is a sectional view showing an example of the first extruder used in the extrusion unit.

FIG. 2 shows one example of the first extruder 3 having a single shaft as used in this embodiment. This extruder 3 includes: a cylinder 13 having a hopper 2 and a filter 12; and a screw 14 provided therein.

As the screw 14 of the first extruder 3, there is no limit in its form. For example, there may be adopted a commonly used screw of the high kneading type having a resin feed section, a compression section and a metering section. As necessary, a portion for facilitating the kneading or mixing such as a torpedo or a Dulmage head may be provided in the intermediate portion and/or the forward end portion of the screw.

Specifically, in the first extruder 3, there is no need of lowering the residual stress of the resin in particular, the uniform kneading and extrusion at high speed will suffice, and a screw of high compression and high shear rate is commonly used.

The screw 14 is provided at the forward end thereof with a uniform kneading improving section 15 formed of a torpedo, whereby, as the screw 14 rotates, the resin pellets fed from the hopper 2 are satisfactorily kneaded while being plasticated, passed through the filter 12 by a propulsive force of the screw 14 and delivered under pressure to the connecting pipe 4.

In the first extruder 3 of the high kneading type, the channel depth of the screw 14 is progressively made smaller from the side of the resin supply to the side of the resin extrusion, whereby the compression ratio is increased. This compression ratio is 2 or more and preferably 3 or more, so that the molten resin can be satisfactorily kneaded by the first extruder 3. A compression ratio of less than 2, is not preferable because unnecessary stagnation of the resin is caused and insufficient kneading at the beginning occurs. Any type of screw 14 may be adopted, i.e. either a type having an equi-pitch (a typical single flighted square pitch) and a varied channel depth or a type having a constant channel depth and a varied pitch is usable. The uniform kneading improving section 15 may be the aforesaid torpedo or a modified torpedo which is a Dulmage head formed at the peripheral surface thereof with axial channels, where resistance is given to the flow of the resin, so that uniform plasticizing and kneading of the resin are performed by shearing. A clearance formed between this uniform kneading improving section 15 and the inner wall of the cylinder 13 is made small, so that a high shear rate can be obtained. For example, when the torpedo is used, the length of the uniform kneading improving portion 15 is 0.1-2 times the diameter D of the screw and preferably 0.2-1.5 times. The clearance between the torpedo and the cylinder 3 may be 0.1-6 mm and preferably 0.3-4 mm, for example. Although a clearance formed between the torpedo and the cylinder wall is varied specifically depending on the length of the torpedo portion, the clearance should be 1/150-1/20 and preferably 1/100-1/30 times the diameter D of the screw. However, it is necessary to select the optimal values in the above-described values in accordance with the type of the resin, lengths of the sections and the like. In this case, when the uniform kneading improving section 15 is a torpedo, the construction is the simplest.

Figure 3:
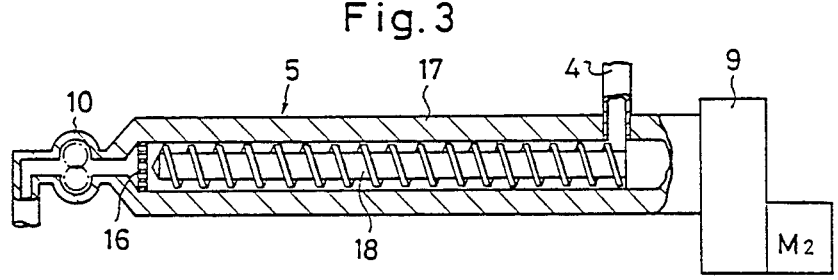
FIG. 3 is a sectional view showing an example of the second extruder used in the extrusion unit.

FIG. 3 shows one example of the second extruder 5 used in this embodiment. This second extruder 5 includes: a cylinder 17 having a filter 16; and a screw 18 provided in this cylinder 17.

As the screw 18, one of moderate (low) compression and low shear rate, having a relatively deep channel depth is used. This screw 18 is rotatably driven by the motor $M_2$ through the speed reducer 9. As the screw 18 rotates, the molten resin, fed through the connecting pipe 4 and satisfactorily kneaded, is passed through the filter 16 by the propulsive force of the screw 18 while being relaxed in stress, delivered to the gear pump 10, where the extrusion flow rate is made constant, and the molten resin is extruded by the die to form the molten film-shaped resin 38.

The screw 18 of this second extruder 5 of the low kneading type has a compression ratio of less than 2, and preferably 1.5 or less. Normally, a straight screw of compression ratio 1 is used, and further, one of the compression ratio 0.5 may be adopted. Metering of the molten resin (regulation of the discharge flow rate) is performed and shear stress remaining in the molten resin is relaxed, and further, cooling of the molten resin is made uniform as necessary. In this cooling for example, the cylinder 17 and the screw 18 are forcedly cooled. Removal of residual shear stress is mainly aimed at by this second extruder 5, in which high kneading and high shear rate do not take place. There is no particular limit on a ratio L/D between the total length L and the diameter D of the screw in the first and second extruders 3 and 5, and it is designed that L/D in the first extruder 3 is 10–30 and L/D in the second extruder 5 is 5–40. Furthermore, in the first and second extruders 3 and 5, the screw diameter of the first extruder 3 is relatively small and that of the second extruder 5 is relatively large. Screw speed of the first extruder 3 is large and that of the second extruder 5 is small, and further, the molding temperature including the screw shear, namely an amount of heat by viscous dissipation of the first extruder 3 is high and that of the second extruder 5 is low.

Figure 4:
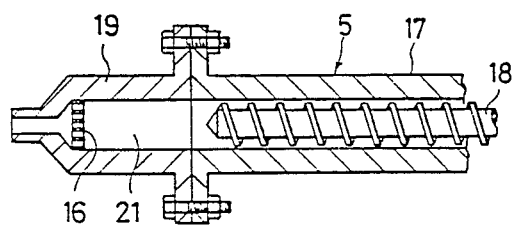
FIG. 4 is a sectional view partially showing a modification of the second extruder.

The second extruder 5 may adopt the construction shown in FIG. 4 for example. In the second extruder 5 shown in FIG. 4, an extended cylinder 19 is flange-to-flange connected to the forward end of the cylinder 17, whereby a non-kneading section 21 having no screw is formed on the forward end of the screw 18, so that shear stress of the resin can be satisfactorily relaxed more than ever. The compression ratio described in this specification means "(channel depth at the resin flow-in end)/(channel depth at the resin extrusion end)" in the case where the pitch of screw is constant in repsective construction portions.

Operation of this embodiment will hereunder be described.

The resin pellets fed from the hopper 2 are satisfactorily kneaded while being plasticated by the rotation of the screw 14, and thereafter, fed into the cylinder 17 of the second extruder 5. In this second extruder 5, the molten resin is relaxed in stress, and thereafter, fed to the gear pump 10 where the flow rate of the molten resin is set at a constant value, through the filter 16. In this case, the motor $M_1$ of the first extruder 3 is controlled to take a suitable operating speed by the speed controller C. More specifically, outlet pressures of the first and second extruders 3 and 5 are detected by the pressure detectors $P_1$ and the $P_2$ and speed of the motor $M_1$ of the first extruder 3 is controlled such that the difference between these pressures detected becomes a constant. The molten film-shaped resin 38 extruded from the extrusion die 30 is passed by the take-up operation of the rolls through the slits 31, 35 and the water tank 37, in which the cooling water flows down, so that the resin characteristics such as transparency can be improved.

According to this embodiment, with the above-described arrangement for extruding the molten film-shaped resin 38, the extrusion unit is divided into two including a first extruder 3 of the high kneading type which aims at uniform plasticizing and kneading and a second extruder 5 of the low kneading type which aims at stress relaxing, whereby, without using an extruder provided with a screw of a special shape, the extrusion stability can be improved and the best designs in accordance with the aims can be rendered to the extruders 3 and 5, so that the selectivity of the systems can be widened and the scope of selection of the operating conditions can be widened. Furthermore, incompatible problems raised between kneading properties and stress relaxing and between high speed molding properties and low temperature extrusion can be solved simultaneously and stable molding at high speed can be realized, so that low manufacturing cost and energy saving can be achieved. The kneading properties are satisfactory and the stress is relaxed satisfactorily, whereby a sheet having excellent in surface characteristics can be extruded, so that a sheet being satisfactory in optical characteristics such as transparency and glossiness can be obtained in cooperation with quick and satisfactory cooling by the cooling device.

Figure 5:
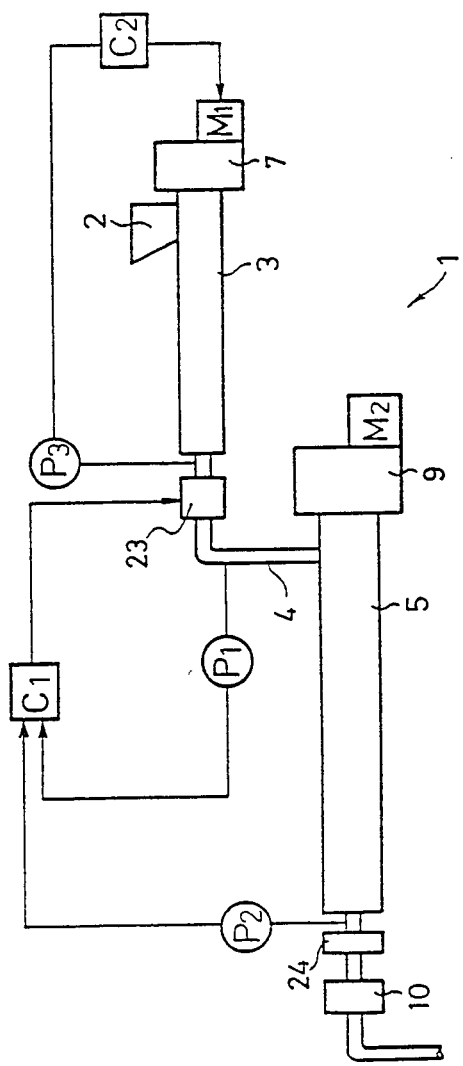
FIG. 5 is an arrangement diagram showing the extrusion unit other than the above.

FIG. 5 shows another embodiment of the system for producing the thermoplastic resin sheet with the cooling device being omitted. Referring to this drawing, such an arrangement is adopted that a gear pump 23 is provided in an intermediate portion of the connecting pipe 4 for connecting the first extruder 3 to the second extruder 5, whereby the gear pump 23 is controlled by a controller $C_1$ such that a difference in pressures detected by the pressure detector $P_1$ provided on the outlet side of this gear pump 23 and the pressure detector $P_2$ provided on the outlet side of the second extruder 5 becomes constant. Furthermore, a pressure detector $P_3$ is provided between the first extruder 3 and the gear pump 23, so that the speed of motor $M_1$ can be regulated through a controller $C_2$ such that a pressure value detected by the pressure detector $P_3$ is maintained at a predetermined value. Further, a filter 24 is provided between the outlet of the second extruder 5 and the gear pump 10.

When the above-described arrangement is adopted, the gear pump 23 is provided between the first extruder 3 and the second extruder 5, whereby, even when insufficiently kneaded resin remains in the extrudate from the first extruder 3, complete kneading can be achieved by the gear wheel rotation of the gear pump 23, so that such an advantage can be added that the problem of unkneaded resin being fed to the second extruder 5 can be obviated. Accordingly, the molding stability and transparency of the resin extruded from the second extruder 5 are not affected at all. The controller $C_1$ controls the speed of gear pump 23 such that the difference between the pressures of the pressure detectors $P_1$ and $P_2$ becomes a constant, so that the first and second extruders 3 and 5 can be regulated automatically and in association with each other. Further, such an arrangement is adopted that a pressure detector $P_3$ is provided in front of the gear pump 23, i.e. on the outlet side of the first extruder 3, whereby the controller $C_2$ controls the speed of motor $M_1$ to control a pressure value thus detected to a predetermined value, so that the operating conditions of the first extruder 3 can hold the delivery of the molten resin to the gear pump 23 at a predetermined requirement.

Incidentally, the number of gear pumps 23 provided on the connecting pipe 4 between the first and second extruders 3 and 5 need not necessarily be limited to one and may be two or more. Further, the number of devices other than the extruders 3 and 5 need not necessarily be limited to one in the arrangement as shown. For example, the gear pump 10 provided on the outlet side of the second extruder 5 is not necessarily required, and, as necessary, a static mixer may be provided on the outlet side of the second extruder 5.

Example

The raw material resin was homopolypropylene (density: 0.91 g/cm$^3$, MI (Melt Index): 2 g/10 min, manufactured by Idemitsu Petrochemical Co., Ltd., trade name: IDEMITSU POLYPRO F200S). The melt web was extruded from a T-die by the use of extrusion equipment having the following screws under the conditions of a resin temperature of 240° C. and a die temperature of 250°.

| First extruder | |
|---|---|
| diameter | D = 65 mm |
| L/D = 24 | |
| compression ratio | 3.5 |
| screw speed | 680 r.p.m. |
| Second extruder | |
| diameter | D = 90 mm |
| L/D = 26 | |
| compression ratio | 2.0 |
| screw speed | 120 r.p.m. |
| Option: Gear pump provided between the first and second extruders. | |
| gear pump speed | 14 r.p.m. |
| Extrusion flow rate | 290 kg/h |
| The melt web had excellent transparency. | |

The present invention with the above-described arrangement can offer the advantages of providing a process of producing a thermoplastic resin sheet an equipment therefor, in which a system having wide selectivity can be used and a thermoplastic resin sheet having improved transparency and glossiness can be produced.

What is claimed is:

1. A process for producing a thermoplastic resin sheet comprising the steps of kneading the thermoplastic resin in a first extruder of a high kneading type and extruding the thermoplastic resin in a molten state; introducing the molten resin into a gear pump in which the molten resin is additionally kneaded; supplying the molten resin from the gear pump to a second extruder of a low kneading type; extruding a molten film-shaped resin from said second extruder through a die located at the outlet of said second extruder; and introducing said molten film-shaped resin through a slit, at an inlet of which cooling water flows in such a manner that it does not stagnate and uniformly cools said molten film-shaped resin.

2. A process of producing a thermoplastic resin sheet as set forth in claim 1, wherein said first extruder of the high kneading type has a compression ratio of 2 or more and said second extruder of the low kneading type has a compression ratio of less than 2.

3. A process of producing a thermoplastic resin sheet as set forth in claim 1, wherein said first extruder has a compression ratio of 3 or more and the second extruder has a compression ratio of 1.5 or less.

4. A process of producing a thermoplastic resin sheet as set forth in claim 1, wherein pressures at the outlets of said first and second extruders are detected, respectively, and a screw speed of said first extruder is controlled in response to the results of detections.

5. An apparatus for producing a thermoplastic resin sheet comprising:
   a first extruder;
   a second extruder serially connected to said first extruder through a pipe means located therebetween;
   a gear pump located on an intermediate portion of said pipe means;
   a die provided on the extrusion side of said second extruder through which a molten film-shaped resin is extruded; and
   a cooling device for cooling said molten film-shaped resin, said cooling device being provided with a slit through which said molten film-shaped resin passes and cooling water flows so as to uniformly cool said molten film-shaped resin.

6. An apparatus for producing a thermoplastic resin sheet and the like as set forth in claim 5, wherein said first extruder has a compression ratio of 3 or more and said second extruder has a compression ratio of 1.5 or less.

7. An apparatus for producing a thermoplastic resin sheet as set forth in claim 5, wherein said first and second extruders each include a screw and a cylinder, and a ratio L/D between the total length L and the diameter D of the screw of said first extruder is 10–30, and a ratio L/D between the total length L and the diameter D of the screw of said second extruder is 5–40.

8. An apparatus for producing a thermoplastic resin sheet as set forth in claim 7, wherein a molten resin uniform kneading section formed of a torpedo, a Dulmage head or the like is provided in the intermediate portion and/or on the forward end portion of the screw of said first extruder.

9. An apparatus for producing a thermoplastic resin sheet as set forth in claim 8, wherein a clearance formed between said uniform kneading section and said cylinder is 1/150–1/20 times the diameter of said screw.

10. An apparatus for producing a thermoplastic resin sheet as set forth in claim 5, wherein pressures at the outlets of said first and second extruders are detected, respectively, and a screw speed of said first extruder is controlled in response to the results of the detections.

11. An apparatus for producing a thermoplastic resin sheet as set forth in claim 5, wherein pressure detectors are provided between said gear pump and said second extruder, and at the outlet of resin extrusion of said second extruder, and further, a controller for maintaining a difference between pressures detected by said pressure detectors at a constant value is provided.

12. A process for producing a thermoplastic resin sheet comprising the steps of kneading the thermoplastic resin in a first extruder having a compression ratio of 2 or more and extruding the thermoplastic resin in a molten state; introducing the molten resin into a gear pump in which the molten resin is additionally kneaded; supplying the molten resin from the gear pump to a second extruder having a compression ratio of less than 2, maintaining the difference in pressures at the discharge of the gear pump and the outlet of the second extruder at a constant amount; extruding a molten film-shaped resin from said second extruder through a die located at the outlet of the second extruder; and introducing said molten film-shaped resin through a slit, at an inlet of which cooling water flows in such a manner that it does not stagnate and uniformly cools said molten film shaped resin.

* * * * *